United States Patent [19]

Rivkin et al.

[11] Patent Number: 4,752,986
[45] Date of Patent: Jun. 28, 1988

[54] LOW PROFILE WHEEL SYSTEM

[76] Inventors: Bernard W. Rivkin, 16287 Oak Creek Trail, Poway, Calif. 92064; Wesley P. Yenerich, 17546 Caminito Balata, San Diego, Calif. 92128

[21] Appl. No.: 757,309

[22] Filed: Jul. 22, 1985

[51] Int. Cl.$^4$ ............................................. B60B 33/00
[52] U.S. Cl. ................................. 16/18 A; 16/18 CG
[58] Field of Search ............... 16/18 A, 18 CG, 18 R, 16/42 R, 47, 35 R, 38, 31 R, 45, 21, 37, 20, DIG. 27, 48, 46

[56]  References Cited

U.S. PATENT DOCUMENTS

| 3,143,895 | 8/1964 | Robie | 16/354 |
| 3,858,271 | 1/1975 | Howard | 16/18 CG |
| 3,928,888 | 12/1975 | Lapham | 16/35 R |
| 4,161,803 | 7/1979 | Propst et al. | 16/18 A |
| 4,327,460 | 5/1982 | Wolff | 16/42 R |

FOREIGN PATENT DOCUMENTS

| 1387907 | 12/1965 | France | 16/20 |
| 1427653 | 1/1966 | France | 16/18 A |
| 2507 | 6/1876 | United Kingdom | 16/18 A |
| 239701 | 9/1925 | United Kingdom | 16/18 A |

Primary Examiner—Frederick R. Schmidt
Assistant Examiner—Maurina Rachuba
Attorney, Agent, or Firm—Albert L. Gabriel

[57] ABSTRACT

According to the preferred form of the invention, a pair of thin wheels is rotatably mounted in the bottom of the body of a caster or other load supporting wheeled device in a bilaterally symmetrical array. Each of the wheels has a downwardly facing outer terrain-engaging surface in the general form of a frustocone, and an upwardly facing inner annular bearing surface which is opposed by a complementary annular bearing surface on the bottom of the body. Preferably one or more anti-friction washers are interposed between the wheel and body bearing surfaces. This arrangement provides large bearing surface areas which are located directly above the lowermost apex of the frustoconical terrain-engaging surface so that direct vertical loading is applied through the bearing surfaces to the terrain-engaging footprint of each wheel, thereby avoiding cantilever action, avoiding any need for rollable bearings, and permitting the wheels to be very thin and of extremely low profile. The caster or other load supporting wheeled device of the invention is thereby enabled to have a large-area footprint with a very shallow, gradual tangential relationship to the terrain, thereby minimizing depression into soft terrain, and this is further aided by a contoured glide surface on the bottom of the body which leads from the front end of the body rearwardly to the wheels.

14 Claims, 3 Drawing Sheets

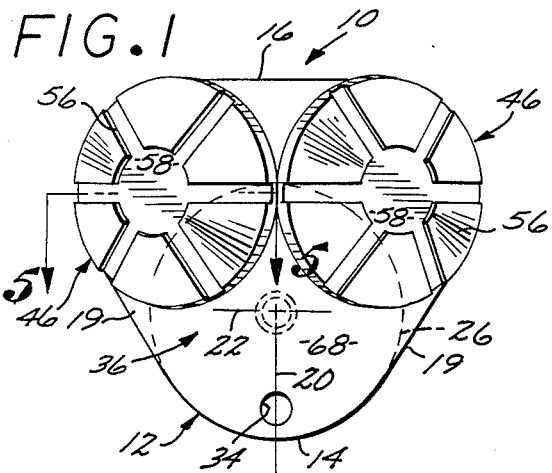
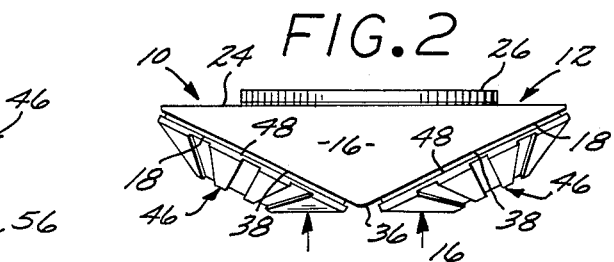
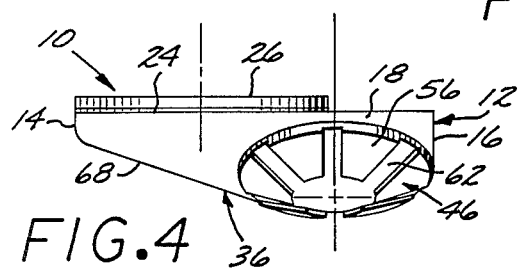
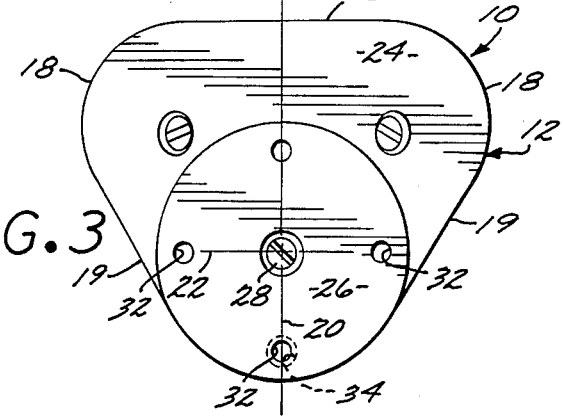
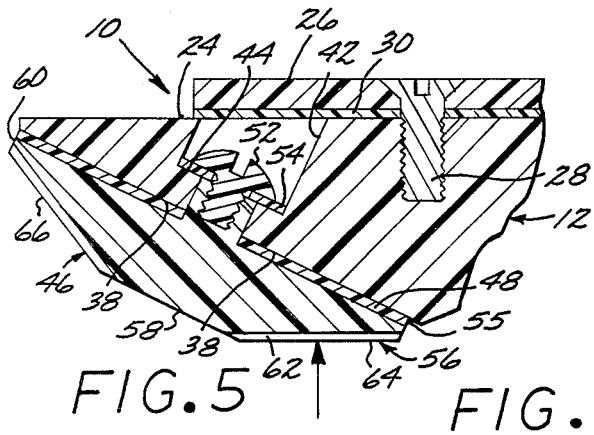
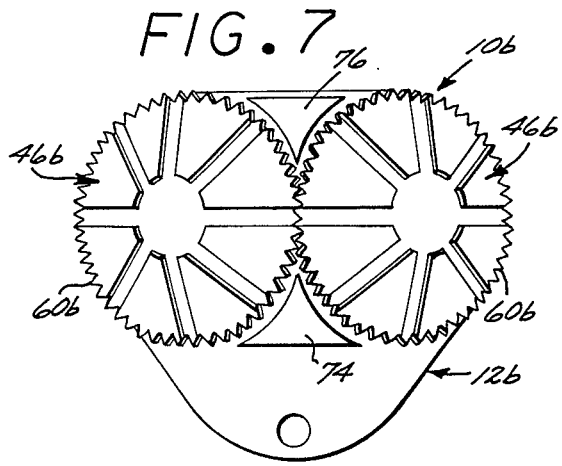
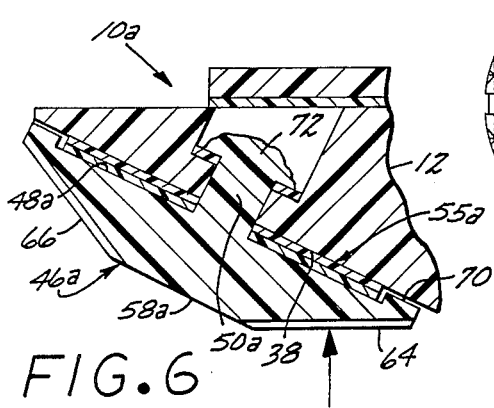
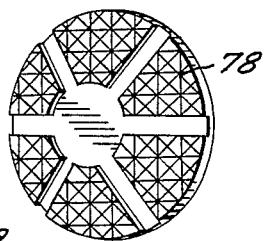
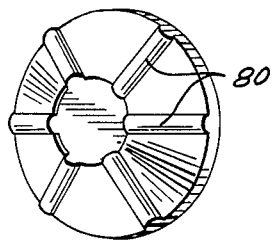
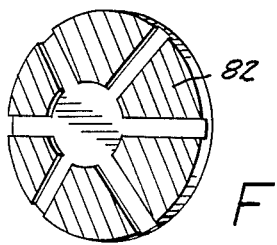
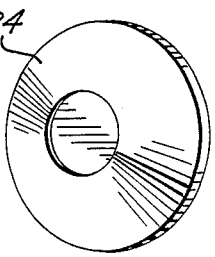

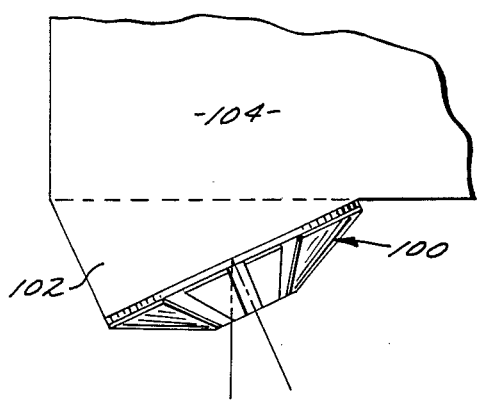
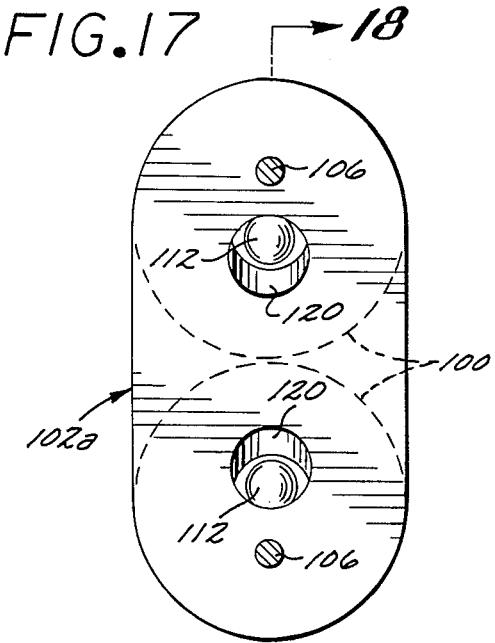
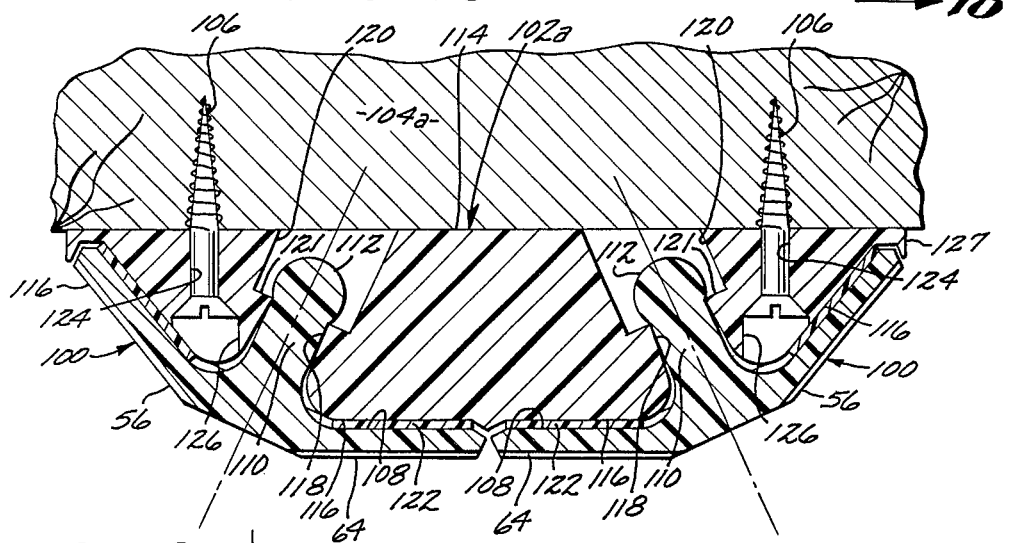
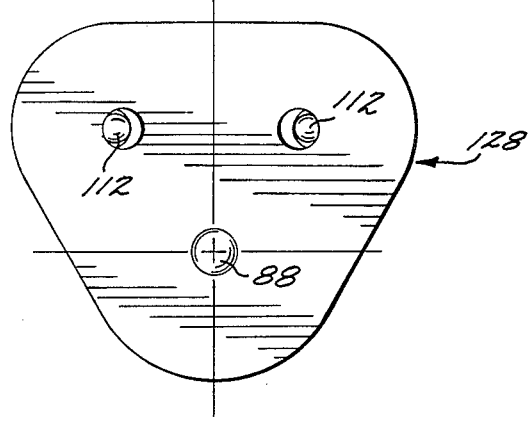
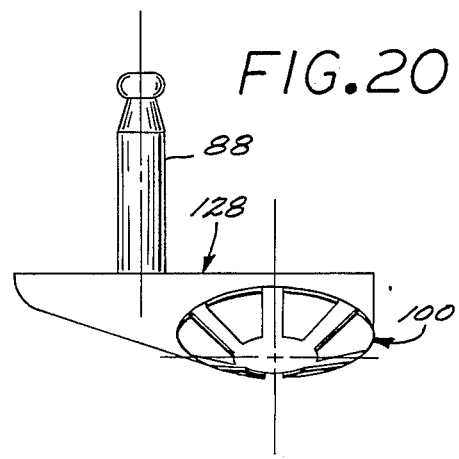

LOW PROFILE WHEEL SYSTEM

BACKGROUND OF THE INVENTION

1. Field of the Invention

The present invention relates generally to wheels and casters, and it relates particularly to low profile, low friction wheels and casters, and load moving devices.

2. Description of the Prior Art

The classic type of furniture caster is a wheel rotating on a horizontal axle mounted on a fork or yoke swivel-mounted forwardly of the wheel axle to achieve caster action. This type of caster has disadvantages of the highest possible profile with consequent instability, unsightliness both from the high profile and from the visible axle mounting, and a narrow footprint. The "footprint" is considered herein to mean that area of caster or other load-bearing wheel or wheels which engages the terrain. The narrow footprint of the classic exposed horizontal axle-type caster has a steep tangential relationship to the terrain such that it indents deeply into carpeting, leaving unsightly depressions, is difficult to set into motion, and continues to be difficult to move even after having been set into motion. Examples of this classic horizontal axle-type caster are seen in U.S. Pat. Nos. 3,718,942 to Arenson, 3,818,541 to Daniels, and U.S. Pat. No. 4,219,903 to Black. The Black patent discloses a pair of ball bearing races for improved freedom of the caster swivel action, but this creates an undesirably higher profile.

In order to conceal unsightly caster wheel mountings, the classic fork or yoke-type caster wheel axle mounting has for the most part been superseded by an inclined single axle upon which the caster wheel is cantilevered in laterally offset relationship to the general longitudinal axis of the caster, the axle and its mounting to the body of the caster being generally concealed by the caster wheel. This inclined, cantilever-type single axle caster wheel mounting has the inherent disadvantage of torsional stress of the wheel against the axle and of the axle against its mounting, which generally requires an undesirably long axle and resulting undesirably high profile. Examples of such cantilevered single axle arrangements are seen in U.S. Pat. Nos. 3,060,488 to Skupas et al, and 4,161,803 to Propst.

In order to relieve the inherent frictional binding stress of cantilevered single axle caster wheels, various rollable bearings have been adopted wherein a rollable bearing wheel or ball bearings support the caster wheel above the footprint region. The presence of such rollable bearings inevitably results in a relatively high caster profile. Examples of devices of this type are seen in U.S. Pat. Nos. 2,810,151 to Lapham, 3,928,888 also to Lapham, 4,034,436 to Ginder, 4,037,292 to Lapham, and 4,327,460 to Wolff.

All of these cantilevered, single inclined axle casters have the same disadvantages as the classic exposed horizontal axle casters of an undesirably high profile, and a narrow footprint having a steep tangential relationship to the terrain which tends to indent deeply in carpeting, leaving unsightly depressions and offering undesirable resistance to movement out of depressions and continued movement through carpeting.

Applicants are not aware of any prior art single axle caster which is not of cantilever construction and does not require some sort of rollable bearing means to relieve axle stresses.

In addition to the aforesaid deficiencies in prior art casters, applicants are not aware of any prior art caster in which the supporting body of the caster has a contoured glide surface which leads down to the caster wheel footprint region so as to additionally minimize indentation of the caster into carpeting and corresponding facilitation of movement through carpeting or over irregular surfaces.

Support wheels for movable loads which are not caster mounted have, in general, the same basic disadvantages as caster wheels, of having an undesirably high profile and a narrow footprint having a steep tangential relationship to the terrain.

SUMMARY OF THE INVENTION

In view of these and other problems in the prior art, it is an object of the present invention to provide a caster or other load supporting wheeled device which has a lower profile than prior art casters and other load supporting devices.

Another object of the invention is to provide a caster or other load supporting wheeled device which has a wider footprint than prior art casters and other load supporting wheeled devices.

Another object of the invention is to provide a caster or other load supporting wheeled device which has a large-area footprint that also has a shallow, gradual tangential relationship to the terrain upon which the wheels rest, thereby minimizing depression into soft terrain such as carpeting, and correspondingly minimizing unsightly depressions in carpeting and minimizing the force required to set the load borne by the device into motion and required to keep the load in motion.

Another object of the invention is to provide a caster or other load supporting wheeled device of the character described wherein the supporing body for the wheel or wheels has a shallow lead-in glide contour which cooperates with the low profile and wide footprint of the wheel or wheels to provide an overall gently curving, shallow draft configuration which depresses minimally into soft terrain such as carpeting.

Another object of the invention is to provide a load supporting wheeled device with improved irregular terrain bridging characteristics.

A further object of the invention is to provide a caster or other load supporting wheeled device which has sngnificantly lowered starting force requirements. A further object of the invention is to provide a caster or other load supporting wheeled device wherein the wheel or wheels rotate in planes set at shallow angles relative to horizontal terrain, preferably not more than approximately 30°, and most preferably approximately 25°.

Another object of the invention is to provide a caster or other load supporting wheeled device of the character described wherein the wheel or wheels have a novel shallow angled frustoconic configuration which, coupled with shallow angles of inclinations of the rotational planes of the wheels, enables the device to have both a very large footprint area and a very shallow or low profile.

Another object of the invention is the further distribution of the weight of the supported object over a greater bearing surface. Prior art concentrates the weight bearing characteristics of previous casters to point contact, whereas the present invention, because of its wide footprint characteristics, allows for the dispersion of the weight bearing surface over a greater square area.

A further object of the invention is to provide a caster or other load supporting wheeled device of the character described wherein large area antifriction bearing surfaces of the body and wheels are located immediately above and generally coincident with the large footprint area so as to avoid the disadvantages of cantilever action, to avoid the need for any rollable bearing means, to minimize unit bearing loading, and to permit an absolute minimum profile height.

Yet another object of the invention is to provide a caster or other load supporting wheeled device of the character described wherein a pair of wheels is gear-interlocked so as to rotate synchronously.

Another object of the invention is to provide a caster or other load supporting wheeled device of the character described wherein the wheels are staked within the body by ultrasonic excitement of plastic material of the wheel stems or axles.

Another object of the invention is to provide a caster or other load supporting wheeled device of the character described wherein the wheel or wheels have pivot stems adapted to be snapped into the pivot bores of the body of the device, enabling the body to be molded to the bottom of the load, or alternatively enabling the body to be screwed to the bottom of the load, and then the wheels later snapped into their operative positions.

A further object of the invention is to provide a caster or other load supporting wheeled device of the character described wherein various frictive surfaces may be utilized on the frustoconic terrain-engaging portions of the wheels.

A further object of the invention is to provide a caster or other load supporting wheeled device the construction of which enables it to be fabricated entirely of plastic materials, whereby the device of the invention is spark proof and hence explosion proof, and is also corrosion proof and can be used submerged or in a damp, puddly environment.

A further object of the invention is to provide a caster or other load supporting wheeled device of the character described which, because of its very low profile and the low force required to move it, enables it to be adhesively attached to a load.

Yet a further object of the invention is to provide a caster or other load supporting wheeled device of the character described which, because of its low profile and ease of movement, is suitable for use as a drawer glide.

A still further object of the invention is to provide a caster or other load supporting wheeled device of simplified construction, which has a minimum number of parts.

The preferred form of the invention is a two-wheeled caster or other load supporting wheeled device comprising a body having a shallow V in transverse section fitted with a pair of wheels bilaterally symmetrically arrayed on opposite sides of the longitudinal axis, or general axis of travel, of the caster or other body. The wheel heads are of frustoconical configuration, having narrow angled frustocone terrain-engaging surfaces, the wheels preferably being rotatably mounted in planes at angles of incidence substantially the same as the frustocone angles so that the frustocones provide wide, generally horizontal footprint surfaces with shallow, gradual tangential relationships to horizontal terrain, which minimizes depression into soft terrain such as carpeting, and thereby minimizes the amount of force required to set the caster or other load supporting wheeled device in motion and keep in motion on soft or irregular terrain. The generally upwardly facing upper, inner annular surface of each wheel provides a large area bearing surface which is opposed by a complementary generally downwardly facing annular bearing surface on the body, these bearing surfaces extending in directly overlapping relationship above the footprint. Thus, direct vertical loading is applied through these bearing surfaces to the footprint, thereby avoiding cantilever action, avoiding any need for rollable bearings such as wheels or ball bearings, and permitting the wheels to be very thin and of extremely low profile without being vulnerable to bending stresses proximal their peripheral margins. Antifriction means, preferably in the form of one or more fluorinated ethylene propylene (FEP) plastic washers such as DuPont's Teflon washers, is interposed between the opposed bearing surfaces of the wheels and body, and such antifriction means coupled with the large bearing surface area and resulting low unit loading results in minimal frictional resistance to movement of the device. The body of the caster or other device has a contoured glide surface forwardly of the shallow frustoconic wheels which serves as a lead-in to the wheels to further minimize overall depression of the caster or other device into soft terrain such as carpeting.

The caster wheels are retained on the body by simple ultrasonic or screw staking of wheel pivot stems, or they may be snapped into their operative positions. In some forms of the invention, a peripheral particle lip is provided on the wheels to minimize entry of carpet fibers or other foreign materials into the bearing region. In one form of the invention, the wheels are gear-locked for coordinated synchronous rotation. One form of the invention has a single wheel, and although it has half the footprint area of the preferred double-wheeled forms, it nevertheless has all of the other stated advantages. A variety of frictive surfaces is provided on the frustoconic terrain-engaging surfaces of the caster wheels.

Casters and other load supporting wheeled devices according to the present invention have the lowest silhouettes and largest area footprints of which applicants are aware.

BRIEF DESCRIPTION OF THE DRAWINGS

These and other objects of the invention will become more apparent in view of the following description taken in conjunction with the drawings, wherein:

FIG. 1 is a bottom plan view of a two-wheeled, plate-mounted caster according to the present invention;

FIG. 2 is a rear end elevational view of the caster shown in FIG. 1;

FIG. 3 is a top plan view of the caster shown in FIGS. 1 and 2;

FIG. 4 is a side elevational view of the caster shown in FIGS. 1-3;

FIG. 5 is an enlarged, fragmentary, transverse sectional view taken on the line 5—5 in FIG. 1 showing internal structural details of the invention;

FIG. 6 is a fragmentary transverse sectional view similar to FIG. 5, but illustrating ultrasonic staking of the caster wheel pivot stem as an alternative to the screw staking shown in FIG. 5;

FIG. 7 is a bottom plan view similar to FIG. 1, but illustrating an alternative form of the invention wherein the caster wheels are gear-interlocked;

FIGS. 8–11 illustrate various alternative frustocone frictive surfaces for the caster wheels of the invention;

FIG. 16 is a fragmentary side elevational view illustrating a further form of the invention in which the body of the load supporting wheeled device is integrally molded to the bottom of the load, and then the wheel or wheels snapped into their operative positions;

FIG. 17 is a top plan view of a modification of the form of the invention shown in FIG. 16 which has a body separate from the load;

FIG. 18 a vertical section taken on the line 18—18 of FIG. 17 illustrating internal details of construction;

FIG. 19 is a top plan view showing a caster form of the devices shown in FIGS. 16–18; and FIG. 20 is a side elevational view of the caster device shown in FIG. 19.

DETAILED DESCRIPTION

Figure 12:
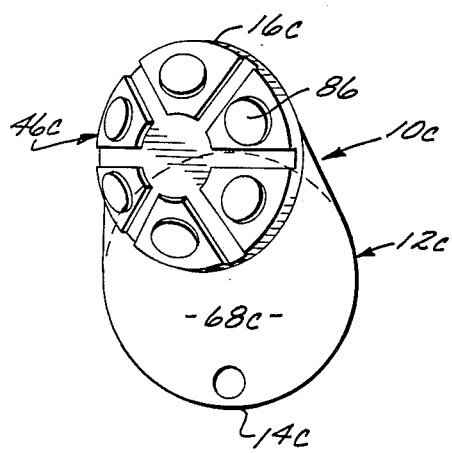
FIG. 12 is a bottom plan view similar to FIGS. 1 and 7, but illustrating an alternative single wheel form of the invention, and also, illustrating a still further type of frustocone frictive surface.

FIGS. 1–5 illustrate one of several forms of the low profile wheel system invention disclosed herein, this form being a caster generally designated 10, and having a body 12 generally triangular in plan and preferably made of a rigid plastic material. Body 12 has a narrow, arcuate leading end 14 and a wide trailing end 16 which has arcuate corners 18 leading to sides 19 that converge toward the leading end 14. The general axis of travel of caster 10, sometimes referred to herein as the longitudinal axis, is designated 20, while the orthogonal transverse axis is designated 22.

Caster body 12 has a flat upper surface 24 to which a flat mounting plate 26 is rotatably attached in parallel relationship by means of a swivel screw 28, the axis of which is at right angles to upper body surface 24 and defines the swivel axis of caster 10. An antifriction washer 30 is interposed between mounting plate 26 and body surface 24. Preferably, the mounting plate 26 is round, with a curvature generally coincident with the arcuate leading end 14 of body 12. Mounting plate 26 has a series of peripherally arranged mounting holes 32 extending therethrough for screw-attachment of mounting plate 26 to the bottom of an item of furniture or other load. A screw access hole 34 extends through body 12 adjacent leading end 14, and body 12 can be rotated about swivel screw 28 to bring access hole 34 sequentially into registry with each of the plate mounting holes 32 for attachment with flat head-type mounting screws. Registry of access hole 34 with one of the mounting holes 32 is illustrated in FIG. 3.

Mounting plate 26 may alternatively be adhesively attached to the bottom of a load. This is possible because of the very low force required to move casters made in accordance with the invention, and also because the very low profile of the present caster minimizes vertical torque applied at the region of attachment.

Body 12 has a shallow triangular profile when viewed from the front or rear, as seen from the rear elevational view of FIG. 2. The lower surface of body 12 is generally designated 36, and includes a pair of flat, annular, generally downwardly and laterally outwardly facing bearing surfaces 38 for the caster wheels. The arcuate outer edges of bearing surfaces 38 register with the rearward arcuate corners 18 of body 12, while the laterally inner edges of bearing surfaces 38 lie adjacent the longitudinal axis 20 of body 12. In this form of the invention, the angle of incidence of each of the downwardly and laterally outwardly facing bearing surfaces 38 relative to the flat upper surface 24 is preferably not greater than 30°, and is most preferably approximately 25°. A pivot bore 40 in body 12 extends upwardly and laterally inwardly from the center of each of the circular bearing surfaces 38, and a counterbore 42 continues upwardly and inwardly from each bore 40 through the flat upper surface 24. An upwardly and inwardly facing shoulder 44 is defined between each bore 40 and its respective counterbore 42. The pivot bores 40 each have the same angle of incidence relative to lines normal to upper body surface 24 as said bearing surface angles of incidence.

Terms of direction throughout this description such as upper, lower, leading, trailing, forward, rearward, transverse, lateral, horizontal, vertical, and the like relate to the casters and other low profile devices as they are attached to the bottom of a load and to the direction of travel of the devices as the load is being moved. These terms are meant to facilitate and clarify the present description, and are not meant by way of limitation.

A pair of thin, matching caster wheels 46 of shallow frustoconical profile is rotatably mounted in the respective bores 40, the wheels 46 being bilaterally symmetrically arrayed on opposite sides of longitudinal axis 20. The caster wheels 46 are preferably made of rigid plastic material, and each has a flat upper bearing surface 48 which generally underlies and registers with a respective bearing surface 38 on body 12. Each caster wheel 46 has a centrally located pivot stem 50 extending orthogonally from the center of its bearing surface 48 and rotatably engaged in the respective bore 40. Each caster wheel 46 is rotatably retained in its operative position by means of a retention bolt 52 axially threadedly engaged in the respective pivot stem 50, with the bolt head and an antifriction washer 54 overlying the respective bore/counterbore shoulder 44. An antifriction washer 55, preferably made of FEP, is interposed between the bearing surface 48 of each caster wheel 46 and the respective body bearing surface 38. The antifriction washers 55 are annular, and are preferably radially coextensive with the flat upper wheel surfaces 48, extending radially from proximate the wheel pivot stems 50 to proximate the peripheral edges of the wheels.

As best seen in FIGS. 2 and 5, the shallow frustoconical profile of each caster wheel 46 is defined by an annular frustoconical frictive surface 56 which extends generally radially from a flat, round central surface 58 to the thin peripheral edge 60 of the wheel. The base of the frustocone of each wheel 46 defines the bearing surface 48. The frictive nature of the frustoconical surface 56 in the form of the invention shown in FIGS. 1–5 is provided by means of a series of regularly spaced, radially oriented friction grooves 62. The shallow angle of incidence of the frustocone of each caster wheel 46 (i.e., the profile angle, whch is the angle between surface 48 and surface 56) is preferably the same as the previously referred to angle of incidence between each of the flat body bearing surfaces 38 and the flat upper body surface 24. Thus, the frustocone angle of incidence or profile angle for each caster wheel 46 is preferably not greater than approximately 30°, and most preferably approximately 25°.

Whether in a stationary or rotational mode, each caster 46 has a bottom or lowermost point 64 which faces downwardly, and a lateral point 66 which faces downwardly and laterally outwardly. Since the aforesaid angles of incidence of the body bearing surfaces 38 and the frustocones 56 of caster wheels 46 are preferably the same, the lowermost point 64 will preferably be parallel to the flat upper body surface 24 and to the generally flat surface of the terrain upon which the caster 10 either rests or rolls. With the preferred angle of incidence of approximately 25°, the flat, round central surface 58 of each caster wheel will be angled laterally upwardly from the bottom point 64 by the shallow angle of approximately 25°, and the lateral point 66 will be angled upwardly and laterally outwardly from the central surface 58 by only another approximately 25°, or a total of approximately 50° from the horizontal bottom point 64.

The shallow angle of incidence of the frustocones 56 relative to the horizontal, and of the axes of rotation of the caster wheels 46 relative to the vertical, result in a very shallow and gradual tangential relationship of the frustoconical frictive surfaces 56 of the wheels relative to the terrain in the region of the bottom point 64, and these shallow, gradual, tangential terrain-engagement areas of the two caster wheels 46 are together defined as the "footprint" of the caster 10. This footprint has a very gradual, arcuate taper from its tangential relationship to the terrain both forwardly and rearwardly of the pivot axes of caster wheels 46 and the transverse tapering is also gradual upwardly from the bottom points 64 of the wheels through the central surfaces 58 to the lateral points 66. This results in the bottom of caster 10 in the region of wheels 46 spreading the caster load over the maximum possible area of the terrain, and over a much greater area of the terrain than any other caster of which applicants are aware.

This gently curving, shallow bottom effected by the caster wheels 46 is complemented by a bottom glide surface 68 on the caster body 12 which curves gradually forwardly and laterally upwardly from the caster wheels 46 to the rounded leading end 14 of body 12. Thus, the cooperative configurations of the bottoms of caster wheels 46 and the bottom glide surface 68 forward of wheels 46 provides an extremely low profile in the general configuration of a shallow draft boat hull. This configuration will result in minimum depression by the caster into soft carpeting and good bridging of irregular surfaces, with the caster 10 in either the stationary mode or the rolling mode. Accordingly, unsightly marks in carpeting are minimized, and initial movement from the stationary mode to the rolling mode is made easy and requires a minimim of horizontal force to cause and continue the movement.

As best seen in FIG. 5, the footprint region of frustocone 56 of each caster wheel 46 is located generally directly vertically below the antifriction washer 55 and body bearing surface 38, whereby the force load is spread generally uniformly between the flat upper wheel surface 48 and the flat body bearing surface 38 across substantially the entire radial extents of these surfaces. This enables a maximal bearing surface area to be achieved with minimal unit loading and consequent minimal friction. Such minimal friction not only enables the caster 10 to be moved over the terrain with a minimum of horizontal force having to be applied, but it also minimizes internal wear forces. This direct vertical overlying of the bearing surfaces above the footprint also completely eliminates cantilevering of the force-receiving footprint region of the caster wheel 46 relative to its pivotal mounting, and this enables the frustocone 56 of each caster wheel 46 to taper out to a very thin peripheral edge 60, since there is no upward bending stress against the peripheral part of the frustocone 56. This thin peripheral edge permitted by the absence of cantilevering, coupled with the aforesaid low angle of incidence which permits an overall thin profile for the caster wheel 46 and the absence of any rollable bearing means such as bearing wheels or ball bearings, enables the caster 10 of the present invention to have an extremely low overall profile which is much lower than prior art casters of which applicants are aware. Nevertheless, the wide bearing surface area of the surfaces 38 and 48, the antifriction washer 55, and the absence of any pivot binding-type friction characteristic of cantilevering result in an overall minimum of frictional resistance to rolling motion of each caster wheel 46.

Figure 15:
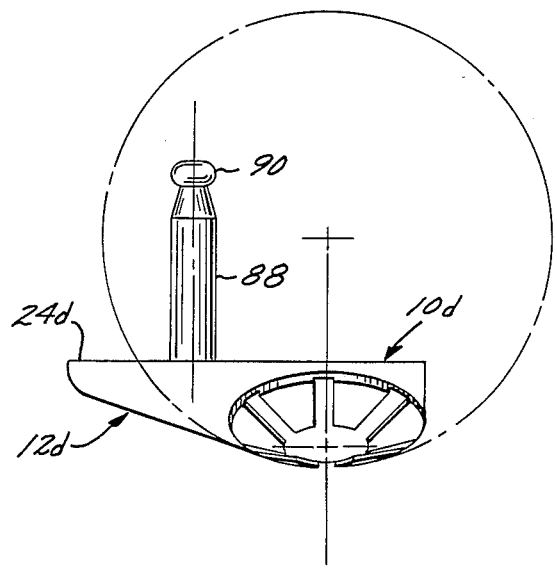
FIG. 15 is a side elevational view of the form of the invention shown in FIGS. 13 and 14.

As an example of the great advantage wheels of the present invention have over conventional caster wheels in having a very low profile while at the same time having a very shallow tangential angle of attack and wide area of the footprint, wheels of the invention only approximately ⅜ inch in height have the same angle of attack and footprint areas as 3 inch diameter conventional wheels, as indicated by the phantom wheel circle in FIG. 15.

FIG. 6 illustrates another caster form of the invention which is the same as the form shown in FIGS. 1–5 except for a peripheral dust lip on each caster wheel, a plurality of the antifriction bearing washers, and an ultrasonically staked pivot stem on each caster wheel. The caster of FIG. 6 is generally designated 10a, and employs the same body 12 as caster 10. Each caster wheel 46a is rotatably supported on body 12 with a pair of anti-friction washers 54a, preferably of FEP, interposed between the upwardly and transversely inwardly facing flat annular bearing surface 48a of wheel 46a and the downwardly and laterally outwardly facing flat annular bearing surface 38 of body 12. An up-turned peripheral annular particle lip or step 70 on each caster wheel 46a closes most of the peripheral gap around the bearing region to bar entry of foreign materials such as carpet fibers into the bearing region so as to protect the effectiveness of the bearing region over a long operational life. In this form of the invention, the screw staking of the bearing wheels is replaced by staking in the form of a radially enlarged integral head 72 on the free end of the pivot stem 50a. This may be accomplished by ultrasonic excitation to the flow point of the plastic material of which the stem 50a is made.

FIG. 7 illustrates another form of caster according to the present invention generally designated 10b, which is the same as the caster 10 of FIGS. 1–5 or the caster 10a of FIG. 6, except that the peripheries 60b of its caster wheels 46b have meshing gear teeth which synchronize the movements of the two caster wheels 46b to assure spreading of the bearing loads of the footprint generally equally in the bearing regions of both wheels 46b, and maintaining the longitudinal axis of caster 10b generally coincident with the axis of travel in the rolling mode. Generally triangular raised platforms 74 and 76 on the bottom surface of body 12b forwardly and rearwardly of the conjunction of the geared peripheries 60b of the wheels protect the geared peripheries from having their movements obstructed by carpet fibers or the like.

FIGS. 8-11 illustrate some alternative frustocone frictive surfaces for low profile wheels according to the invention. Thus, the frustocone frictive surface 78 of the caster wheel shown in FIG. 8 is characterized by a regular annular series of raised elastomeric pads having a diamond surface embossment. FIG. 9 shows a frustocone frictive surface consisting of a regular annular array of radially oriented, raised, elastomer-covered ribs 80. FIG. 10 illustrates a frustocone frictive surface 82 in the form of a regular annular array of generally wedge-shaped elastomeric pads. FIG. 11 shows a frustocone frictive surface in the form of any unbroken annular elastomeric surface 84.

FIG. 12 illustrates a single wheel form of the invention generally designated 10c which is the same as the form 10 shown in FIGS. 1-5 or 10a shown in FIG. 6, except that only a single caster wheel 46c is employed, and the plan of body 12c is recontoured accordingly. Thus, the body 12c has a slight narrowing taper from its arcuate leading end 14c to its arcuate trailing end 16c. The same flat annular bearing surface arrangement, antifriction washer means, and wheel pivot stem and stem retention means, and the same angle of incidence of the body and wheel bearing surfaces and the wheel pivot stem is provided in the single wheel caster 10c of FIG. 12 as is provided for one of the caster wheels of the caster 10 of FIGS. 1-5 or the caster 10a of FIG. 6. The frictive surface 86 of caster wheel 46c is in the form of a regularly spaced annular array of wedges separated by grooves and each bearing a disk-shaped elastomeric pad thereon. Body 12c has a bottom glide surface 68c similar to the bottom glide surface 68 of caster 10 as shown in FIGS. 1 and 4 which contours gently downwardly and rearwardly from a relatively thin arcuate leading edge to the single caster wheel 46c as a lead-in for travel over soft carpeting or irregular terrain and the like.

Figure 13:
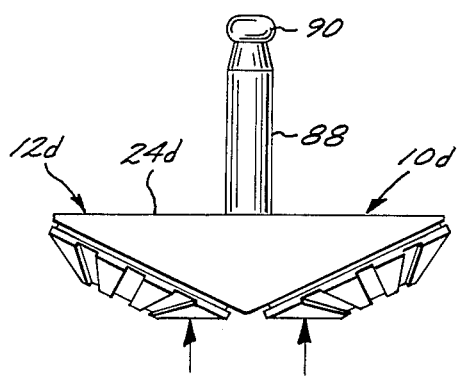
FIG. 13 is a rear end elevational view of another form of the invention which is swivel-mounted by means of a mounting stem.
Figure 14:
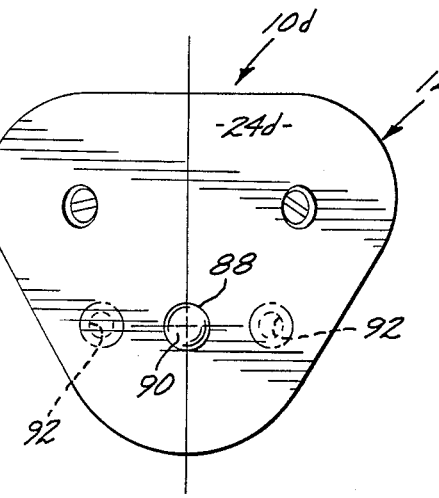
FIG. 14 is a top plan view of the stem-mounted embodiment shown in FIG. 13.

FIGS. 13-15 illustrate another form of the invention which is the same as the form shown in FIGS. 1-5 or FIG. 6 except for a different type of swivel mounting. The body 12c of caster 10d in FIGS. 13-15 has a mounting stem 88 projecting orthogonally upwardly from the flat upper surface 24d of body 12d, terminating at its free end in a retention ball 90. As seen in FIGS. 14 and 15, the swivel axis of mounting stem 88 is located substantially forwardly of the pivot axes of the caster wheels. If desired, any of the swivel-mounted forms of the invention shown in FIGS. 1-15 may alternatively be fixedly mounted by omitting the swivel device and providing a plurality of screw or bolt holes extending through the body in the region of the forward bottom glide surface, as for example the holes 92 shown in phantom in FIG. 14.

FIGS. 16-20 illustrate forms of the present invention embodying a low profile wheel 100 which has an internal construction modified from that of the caster wheels 46 and 46a shown in FIGS. 5 and 6, respectively, but which has the same external frustoconical configuration and is pivotally mounted on the same angle of inclination relative to the vertical. The internal modifications of the low profile wheel 100 provide two advantages. First, in the region of the footprint, the opposed body and wheel bearing surfaces are horizontal, and hence normal to the direction in which the load is applied. This gives a maximum bearing surface area with accompanied minimum unit loading, and eliminates all shear stress from the pivot stem. Second, because of the elimination of shear stress from wheel pivot stem, the wheel stems need only be lightly retained in the stem sockets, which permits snap-in attachment of each wheel, and this in turn allows the wheel support body to be integrally molded on the bottom of the load, and the low profile wheel or wheels 100 later snapped into their operative positions, or alternatively allows a separate wheel support body to be screw-attached to the bottom of the load and the wheel or wheels snapped into position after attachment.

FIG. 16 shows the low profile wheel 100 operatively rotatably mounted on a support body 102 integrally molded to the bottom of the load 104. A typical load 104 to which body 102 is molded would be luggage, loud speaker stands, planters and the like.

FIGS. 17 and 19 illustrate a pair of the low profile wheels 100 operatively rotatably mounted on a support body 102a which is separate from the load 104a and is attached to the load 104a by means of screws 106. The attachment of support body 102a to load 104a was accomplished before the low profile wheels 100 were snapped into position.

Each of the low profile wheels 100 has an annular frustoconical lower outer surface 56 which is the same as the frustoconical outer surface 56 on the form of the invention shown in FIG. 5. This frustoconical lower outer surface 56 has lowermost point of travel 64 which is horizontal, and again is the same as the lowermost point of travel 64 in the form shown in FIG. 5.

One of the differences in construction between the wheel 100 and the wheel 46 of FIG. 5 is that on the wheel 100 the upper, inner bearing surface 108 is frustoconical instead of flat as in the form shown in FIG. 5. This frustocone of the upper bearing surface 108 is parallel to the lower, outer frustocone 56; i.e., inner frustocone 108 is annular and coaxial with the outer frustocone 56 and the two frustocones 108 and 56 have the same angle of incidence relative to the pivot axis of the wheel. This angle of incidence is the same as the angle of incidence relative to the vertical of wheel pivot stem 110, and this places the lowermost point of travel 64, and hence the center of the footprint of wheel 100, horizontal. The pivot stem 110 of each wheel 100 has a slightly enlarged, rounded stem head 112 for snap-in retention of the wheel in its operative position.

The body 102a has a flat upper surface 114 for engagement of body 102a flush against the flat bottom surface of load 104a. A pair of downwardly and outwardly facing annular frustoconical bearing surfaces 116 are bilaterally symmetrically located on body 102a, and these have the same frustocone angle of incidence as the wheel bearing surfaces 108. These annular body bearing surfaces 108 are coaxial with a pair of respective bores 108 in the body within which the respective wheel pivot stems 110 are journalled. Each of the bores 118 has an upper counterbore which extends through the upper surface 114 of the body to provide shoulders 121 against which the stem heads 112 are retained. The bores 118 taper inwardly from their lower ends to their upper ends at shoulders 121 as lead-ins for the slightly oversized stem heads 112 to permit the snap-in engagement feature.

A frustoconical antifriction washer 122 is interposed between each of the frustoconical body bearing surfaces 116 and the frustoconical bearing surface 108 of the respective wheel 100. The antifriction washers 122 have the same frustocone angle of incidence as the bearing surfaces 116 and 108.

Preferably, the upwardly facing inner annular surface of each wheel 100 curves arcuately from the annular bearing surface 108 into the stem 110 to provide filet-like reinforcement at the root of each pivot stem 110.

A pair of vertical bores 124 extends through body 102a to accommodate screws 106, and these bores 124 have downwardly opening counterbores 126 to receive the screw heads. The body 102a is screwed to the load 104a by means of screws 106 prior to attachment of wheels 100 and washers 122, and then the wheels 100 are simply snapped into their operative positions with the washers 122 interposed between the wheel bearing surfaces 108 and the body bearing surfaces 116.

If desired, the form of the invention shown in FIGS. 17 and 18 may include a peripheral particle lip 127. This peripheral particle lip 127 depends from the periphery of the body 102a, instead of projecting upwardly from the periphery of the wheel as in the form shown in FIG. 6.

While the low profile wheel form 100 has been shown in detail in FIGS. 17 and 18 in a fixed mounting system, it is equally adaptable for use in a caster mounting system, as illustrated in FIGS. 19 and 20, which show the wheel 100 mounted on a caster body 128 similar in external configuration to the caster body 12d in the form of the invention shown in FIGS. 14 and 15. The caster body 128 is swivel mounted by means of mounting stem 88. Alternatively, plate-type caster mounting may be provided as in the forms of the invention shown in FIGS. 1–6.

Although the caster wheels 100 have been shown in double-wheeled embodiments in FIGS. 16–20, it is to be understood that they may be used in single-wheeled embodiments of the invention, as for example like the embodiment shown in FIG. 12.

As shown in FIGS. 5, 6 and 18, the low profile caster or other load supporting wheeled device of the present invention may be made entirely of plastic material, this being enabled even with the extremely low profile by the lack of bending or binding stresses on the wheels because of the noncantilever construction. Such all-plastic construction of the exposed portions of the invention makes it desirable for use in "explosion-free" areas where sparks caused by metal upon metal could prove disastrous. The all-plastic construction of the invention also makes it corrosion proof, and thereby enables it to be used submerged or in a damp, puddly environment.

The very low profile of the present caster or other load supporting wheeled device gives it surprising advantages in addition to those stated above. Thus, the minimum vertical clearance required for the device of the invention permits its use as a free-wheeling drawer glide. In view of such use for which conventional high profile casters and other load supporting wheeled device would not be practical, and other possible uses for the caster or other load supporting wheeled device of the present invention which would not be suitable for conventional casters and wheeled devices, it is to be understood that the terms "caster" and "load supporting wheeled device" as used herein are not meant to be limiting and are intended to include any of the various uses for which the present invention may be employed.

In summary, advantageous features of the present invention include a very low profile which cooperates with a wide footprint for minimal depression into soft terrain and provides a pleasing appearance; absence of complexity and height required by conventional rollable bearings of prior art casters and other load supporting wheeled devices, while nevertheless having a minimum of rolling friction; a minimum number of parts and simplicity of parts making the device of the invention simple and economical to manufacture; the ability to manufacture the invention entirely of plastic materials, giving it noncorrosive and nonexplosive characteristics; and large wheel and body bearing areas for minimal internal friction and wear.

While the present invention has been described with reference to presently preferred embodiments, it is to be understood that modifications or alterations may be made by those skilled in the art without departing from the scope and spirit of the invention as set forth in the appended claims.

We claim:

1. A low profile wheeled device for engaging a generally flat terrain, said low profile wheeled device comprising:
    a body having upper and lower portions, said body upper portion having a flat surface parallel to the generally flat terrain;
    at least one wheel rotatably mounted on the bottom of said body on an axis rotation angularly offset by a shallow acute angle of incidence from the vertical, said wheel having generally downwardly exposed annular terrain-engaging surface means thereon which rotates through a lowermost point, located on a line parallel to the flat upper body surface and to the generally flat terrain, where it is adapted to engage the terrain;
    opposed, facing, complementary bearing surfaces on said body and wheel are annular about said axis of rotation, and which generally directly overlie said point for direct, noncantilever transmission of vertical load forces from said body through said wheel to the terrain;
    said bearing surfaces being large-area antifriction surfaces which have a sliding antifriction action without intervening rollable bearing means, the absence of rollable bearing means enabling minimization of profile height of said wheeled device; and
    antifriction washer means interposed between said bearing surfaces.

2. A low profile wheeled device as defined in claim 1, wherein said antifriction washer means is composed of fluorinated ethylene propylene plastic.

3. A low profile wheeled device for engaging a generally flat terrain, said low profile wheeled device comprising:
    a body having upper and lower portions, said body upper portion having a flat surface parallel to the generally flat terrain;
    at least one wheel rotatably mounted on the bottom of said body on an axis of rotation angularly offset by a shallow acute angle of incidence from the vertical, said wheel having generally downwardly exposed annular terrain-engaging surface means thereon which rotates through a lowermost point, located on a line parallel to the flat upper body surface and to the generally flat terrain, where it is adapted to engage the terrain;

opposed, facing, complementary bearing surfaces on said body and wheel which are annular about said axis of rotation, and which generally directly overlie said point for direct, noncantilever transmission of vertical load forces from said body through said wheel to the terrain;

said bearing surfaces being large-area antifriction surfaces which have a sliding antifriction action without intervening rollable bearing means, the absence of rollable bearing means enabling minimization of profile height of said wheeled device;

said terrain-engaging surface means being substantially frustoconical; and said bearing surfaces being substantially frustoconical and substantially parallel to said terrain-engaging surface means.

4. A low profile wheeled device for engaging a generally flat terrain, said low profile wheeled device comprising:

a body having upper and lower portions, said body upper portion having a flat surface parallel to the generally flat terrain;

at least one wheel rotatably mounted on the bottom of said body on an axis of rotation angularly offset by a shallow acute angle of incidence from the vertical, said wheel having generally downwardly exposed annular terrain-engaging surface means thereon which rotates through a lowermost point, located on a line parallel to the flat upper body surface and to the generally flat terrain, where it is adapted to engage the terrain;

opposed, facing, complementary bearing surfaces on said body and wheel which are annular about said axis of rotation, and which generally directly overlie said point for direct, noncantilever transmission of vertical load forces from said body through said wheel to the terrain;

said bearing surfaces being large-area antifriction surfaces which have a sliding antifriction action without intervening rollable bearing means, the absence of rollable bearing means enabling minimization of profile height of said wheeled device;

said terrain-engaging surface means being substantially frustoconical; and said substantially frustoconical terrain-engaging surface means having an angle of incidence relative to a plane normal to said axis of rotation that is substantially the same as said angle of incidence of said axis of rotation, whereby said lowermost point of said frustoconical surface means is substantially horizontal, and said bearing surface proximate said lowermost point are also substantially horizontal.

5. A low profile wheeled device for engaging a generally flat terrain, said low profile wheeled device comprising:

a body having upper and lower portions, said body upper portion having a flat surface parallel to the generally flat terrain;

at least one wheel rotatably mounted on the bottom of said body on an axis of rotation angularly offset by a shallow acute angle of incidence from the vertical, said wheel having generally downwardly exposed annular terrain-engaging surface means thereon which rotates through a lowermost point, located on a line parallel to the flat upper body surface and to the generally flat terrain, where it is adapted to engage the terrain;

opposed, facing, complementary bearing surfaces on said body and wheel which are annular about said axis of rotation, and which generally directly overlie said point for direct, noncantilever transmission of vertical load forces from said body through said wheel to the terrain;

said bearing surfaces being large-area antifriction surfaces which have a sliding antifriction action without intervening rollable bearing means, the absence of rollable bearing means enabling minimization of profile height of said wheeled device;

said axis of rotation of said wheel being defined by means of a pivot stem on said wheel projecting generally upwardly from the center of said wheel bearing surface into a complementary bore in said body;

said bore having a counterbore extending upwardly through the top of said body, a generally upwardly facing annular shoulder being defined between said bore and counterbore; and enlarged means on the upper end of said pivot stem overlying said shoulder means so as to retain said wheel on said body.

6. A low profile wheeled device as defined in claim 5, wherein said enlarged means comprises screw means.

7. A low profile wheeled device as defined in claim 5, wherein said pivot stem is composed of substantially rigid plastic material, and said enlarged means comprises a radial enlargement on said stem produced by ultrasonic excitation of the plastic material.

8. A low profile wheeled device as defined in claim 5, wherein said enlarged means provides a snap-in fit of said pivot stem in said bore.

9. A low profile wheeled device for engaging a generally flat terrain, said low profile wheeled device comprising:

a body having upper and lower portions, said body upper portion having a flat surface parallel to the generally flat terrain; at least one wheel rotatably mounted on the bottom of said body on an axis of rotation angularly offset by a shallow acute angle of incidence from the vertical, said wheel having generally downwardly exposed annular terrain-engaging surface means thereon which rotates through a lowermost point, located on a line parallel to the flat upper body surface and to the generally flat terrain, where it is adapted to engage the terrain;

opposed, facing, complementary bearing surfaces on said body and wheel which are annular about said axis of rotation, and which generally directly overlie said point for direct, noncantilever transmission of vertical load forces from said body through said wheel to the terrain;

said bearing surfaces being large-area antifriction surfaces which have a sliding antifriction action without intervening rollable bearing means, the absence of rollable bearing means enabling minimization of profile height of said wheeled device;

said body having a longitudinal axis that is the general axis of travel of the device, and which comprises a pair of said wheels mounted on the bottom of said body generally bilateraly symmetrically of said longitudinal axis;

said wheels having interengaging peripheral teeth for synchrous movement of the wheels.

10. A low profile wheeled device for engaging a generally flat terrain, said low profile wheeled device comprising:
- a body having upper and lower portions, said body upper portion having a flat surface parallel to the generally flat terrain;
- at least one wheel rotatably mounted on the bottom of said body on an axis of rotation angularly offset by a shallow acute angle of incidence from the vertical, said wheel having generally downwardly exposed annular terrain-engaging surface means thereon which rotates through a lowermost point, located on a line parallel to the flat upper body surface and to the generally flat terrain, where it is adapted to engage the terrain;
- opposed, facing, complementary bearing surfaces on said body and wheel which are annular about said axis of rotation, and which generally directly overlie said point for direct, noncantilever transmission of vertical load forces from said body through said wheel to the terrain;
- said bearing surfaces being large-area antifriction surfaces which have a sliding antifriction action without intervening rollable bearing means, the absence of rollable bearing means enabling minimization of profile height of said wheeled device; and
- said body having a longitudinal axis directed generally from a front end of the body to a rear end of the body, said wheel being mounted adjacent said rear end of the body, and a forward portion of the body in front of said wheel comprising lead-in glide surface means which tapers from an upward forward portion downwardly and rearwardly to proximate said wheel as a lead-in for movement of said wheel in soft or irregular terrain.

11. A low profile wheeled device for engaging a generally flat terrain, said low profile wheeled device comprising:
- a body having upper and lower portions, said body upper portion having a flat surface parallel to the generally flat terrain;
- at least one wheel rotatably mounted on the bottom of said body on an axis of rotation angularly offset by a shallow acute angle of incidence from the vertical, said wheel having generally downwardly exposed annular terrain-engaging surface means thereon which rotates through a lowermost point, located on a line parallel to the flat upper body surface and to the generally flat terrain, where it is adapted to engage the terrain;
- opposed, facing, complementary bearing surfaces on said body and wheel which are annular about said axis of rotation, and which generally directly overlie said point for direct, noncantilever transmission of vertical load forces from said body through said wheel to the terrain;
- said bearing surfaces being large-area antifriction surfaces which have a sliding antifriction action without intervening rollable bearing means, the absence of rollable bearing means enabling minimization of profile height of said wheeled device; and
- said longitudinal axis being directed generally from a front end of the body to a rear end of the body, said wheel being mounted adjacent said rear end of the body, and a forward portion of the body in front of said wheel comprising lead-in glide surface means which tapers from an upward forward portion downwardly and rearwardly to proximate said wheel as a lead-in for movement of said wheel in soft or irregular terrain.

12. A low profile wheeled device for engaging a generally flat terrain, said low profile wheeled device comprising:
- a body having upper and lower portions, said body upper portion having a flat surface parallel to the generally flat terrain;
- at least one wheel rotatably mounted on the bottom of said body on an axis of rotation angularly offset by a shallow acute angle of incidence from the vertical, said wheel having generally downwardly exposed annular terrain-engaging surface means thereon which rotates through a lowermost point, located on a line parallel to the flat upper body surface and to the generally flat terrain, where it is adapted to engage the terrain;
- opposed, facing, complementary bearing surfaces on said body and wheel which are annular about said axis of rotation, and which generally directly overlie said point for direct, noncantilever transmission of vertical load forces from said body through said wheel to the terrain;
- said bearing surfaces being large-area antifriction surfaces which have a sliding antifriction action without intervening rollable bearing means, the absence of rollable bearing means enabling minimization of profile height of said wheeled device; and
- said annular terrain-engaging surface means comprising frictive surface means for improving the grip of said wheel on the terrain.

13. A low profile wheeled device for engaging a generally flat terrain, said low profile wheeled device comprising:
- a body having upper and lower portions, said body upper portion having a flat surface parallel to the generally flat terrain;
- at least one wheel rotatably mounted on the bottom of said body on an axis of rotation angularly offset by a shallow acute angle of incidence from the vertical, said wheel having generally downwardly exposed annular terrain-engaging surface means thereon which rotates through a lowermost point, located on a line parallel to the flat upper body surface and to the generally flat terrain, where it is adapted to engage the terrain;
- opposed, facing, complementary bearing surfaces on said body and wheel which are annular about said axis of rotation, and which generally directly overlie said point for direct noncantilever transmission of vertical load forces from said body through said wheel to the terrain;
- said bearing surfaces being large-area antifriction surfaces which have a sliding antifriction action without intervening rollable bearing means, the absence of rollable bearing means enabling minimization of profile height of said wheeled device; and
- said body being adapted to be rigidly mounted on a load.

14. A low profile wheeled device for engaging a generally flat terrain, said low profile wheeled device comprising:
- a body having upper and lower portions, said body upper portion having a flat surface parallel to the generally flat terrain;
- at least one wheel rotatably mounted on the bottom of said body on an axis of rotation angularly offset by a shallow acute angle of incidence from the vertical, said wheel having generally downwardly exposed annular terrain-engaging surface means thereon which rotates through a lowermost point, located on a line parallel to the upper body surface and to the generally flat terrain, where it is adapted to engage the terrain;

opposed, facing, complementary bearing surfaces on said body and wheel which are annular about said axis of rotation, and which generally directly overlie said point for direct, noncantilever transmission of vertical load forces from said body through said wheel to the terrain;

said bearing surfaces being large-area antifriction surfaces which have a sliding antifriction action without intervening rollable bearing means, the absence of rollable bearing means enabling minimization of profile height of said wheeled device; and said body being integral with a load.

* * * * *